United States Patent [19]

Wooddy, Jr. et al.

[11] 3,944,065

[45] Mar. 16, 1976

[54] DRIVE BELT REPAIR KIT

[76] Inventors: Douglas W. Wooddy, Jr.; Muna G. Wooddy, both of 7005 Martin Drive, Apt. 208, Lake Kenilworth Apts., New Orleans, La. 70126

[22] Filed: Sept. 17, 1974

[21] Appl. No.: 506,785

[52] U.S. Cl. ............... 206/223; 156/137; 156/180; 206/229
[51] Int. Cl.² ................... B65D 69/00; B65D 71/00
[58] Field of Search ........... 206/223, 229, 227, 219, 206/409, 389; 156/137, 139, 180; 118/420

[56] References Cited
UNITED STATES PATENTS

| | | |
|---|---|---|
| 2,233,294 | 2/1941 | Merrill et al. .......................... 156/139 |
| 2,864,492 | 12/1958 | Laprala ................................ 206/219 |

*Primary Examiner*—William T. Dixson, Jr.
*Attorney, Agent, or Firm*—Howard I. Podell

[57] ABSTRACT

A drive belt repair kit which forms a continuous winding of tension cord and adhesive when applied to a pair of pulleys. The tension cord is wound, in use, about the two pulleys to form a multi-layer belt of desired length and tension. The tension cord and adhesive may be initially stored as a repair kit in a container fastened to a leader cord. The leader cord, in use, is initially fastened about the pair of pulleys to be belted. Rotation of the pulleys pulls the tension cord and adhesive about the pulleys to form a multi-layer belt.

2 Claims, 2 Drawing Figures

DRIVE BELT REPAIR KIT

SUMMARY OF THE INVENTION

My invention relates to a drive belt that may be applied to link a pair of pulleys and particularly to a drive belt repair kit.

The drive belt kit forms a continuous winding of tension cord and adhesive when applied to a pair of pulleys. The tension cord is wound, in use, about the two pulleys to form a multilayer belt of desired length and tension.

The tension cord and adhesive may be initially stored as a repair kit in a container fastened to a leader cord. The leader cord, in use, is initially fastened about the pair of pulleys to be belted. Rotation of the pulleys pulls the tension cord and adhesive about the pulleys to form a multi-layer belt.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
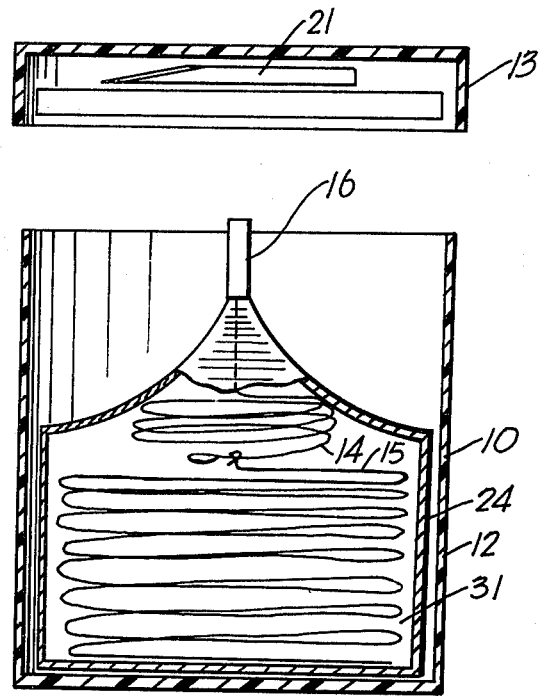
FIG. 1 is an exploded sectional view of the repair kit and container.

Turning now descriptively to the drawings, in which similar reference characters denote similar elements throughout the several views, FIG. 1 shows the repair kit 10 which is housed in a cylindrical container 12 and cap 13. A hollow can 24 in the container 12 encloses a continuous flexible tension cord 15, the free end of which is fastened to a leader cord 14 that leads to a sealed orifice 16 at the top of the can 24. The removable cap 13 of the kit 10 may house a knife blade 21 for use in cutting the tip of the orifice 16 so as to free the leader cord end 25.

A liquid adhesive 31, that dries in air, fills the interior of the can 24 and coats the tension cord 15 as it is removed.

Figure 2:
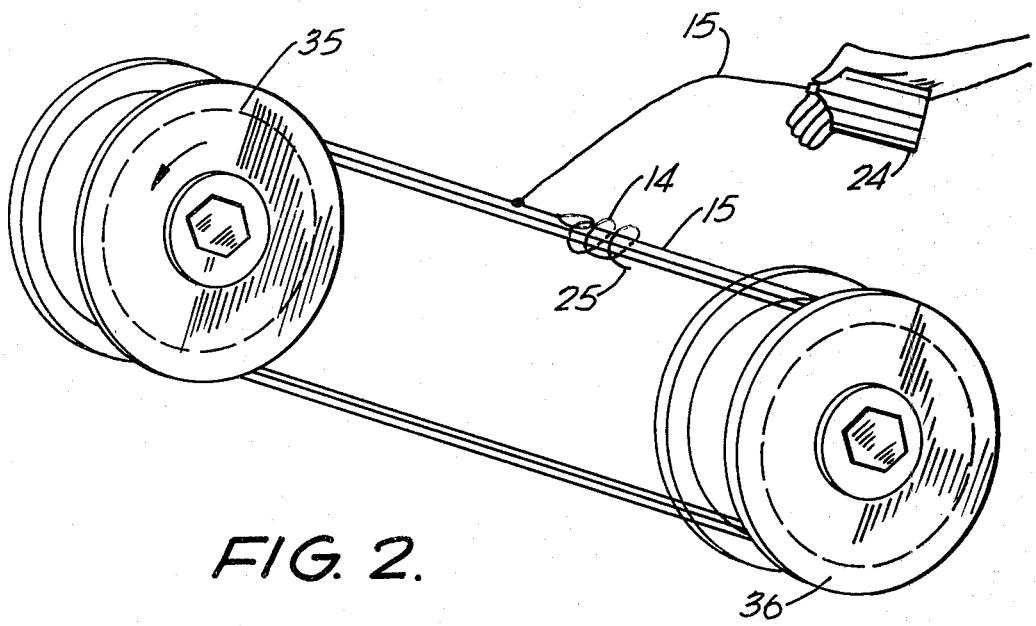
FIG. 2 is a perspective view of the invention in use.

As shown in FIG. 2, the kit is employed in use to form a drive belt about a pair of pulleys 35 and 36 by initially wrapping the leader 14 and the tension cord 15 a few turns tightly about both pulleys 35 and 36. Drive pulley 35 may then be rotated so as to draw the remainder of the tension cord 15 in the can 24 about the pulleys to form a belt of desired tightness and thickness. After the adhesive 31 dries, the belt may be dressed using knife blade 21.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A drive belt repair kit that may be employed to form a continuous belt about a pair of pulleys, comprising a container housing a tension cord and a liquid air-drying adhesive, with a free end of the tension cord fastened to a sealed orifice of the container, prior to use.

2. The combination as recited in claim 1 in which the container is fitted with a detachable cap housing a knife for use in cutting the container orifice and for the subsequent dressing of a belt formed of the tension cord and adhesives.

* * * * *